May 1, 1923.

E. G. THOMAS

DASHPOT

Filed Oct. 7, 1918

Witness
C. E. Hilcox.
Frances Doyle

Inventor
Edward G. Thomas.

By George R. Frye
Attorney

May 1, 1923.

E. G. THOMAS

DASHPOT

Filed Oct. 7, 1918

Inventor
Edward G. Thomas.

Witness
C. E. Hilcox.
Frances Doyle

By George R. Frye.

Attorney

Patented May 1, 1923.

1,453,733

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

DASHPOT.

Application filed October 7, 1918. Serial No. 257,090.

*To all whom it may concern:*

Be it known that I, EDWARD G. THOMAS, a citizen of the United States, residing at Toledo, in the county of Lucas and State of Ohio, have invented certain new and useful Improvements in Dashpots, of which the following is a specification.

This invention relates to dash pots or similar vibration reducing mechanism wherein the fluid, such as air, oil, etc., is utilized to check the movement of a plunger connected with a moving part of the machine.

The principle on which these dash pots operate is to create resistance by causing a body of fluid to pass through a small opening in or around the moving plunger, the adjustability of the opening providing a means for varying the resistance to motion offered and reducing or extending the time necessary to bring the scale to rest in accordance with the work to be done in transferring the fluid from one side of the plunger to the other. My device provides an improved and automatic means for varying the resistance of the passage of fluid from one side of the plunger to the other in accordance with the force with which the scale beam tends to vibrate.

With the above and other objects in view which will readily appear as the invention is better understood, my invention consists in the novel construction, combination and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:—

Figure 1 is a plan view of my improved dash pot;

Figure 2 is a vertical section through the same;

Figure 3 is a detail of the valve mechanism, with parts in section; and

Figure 4:
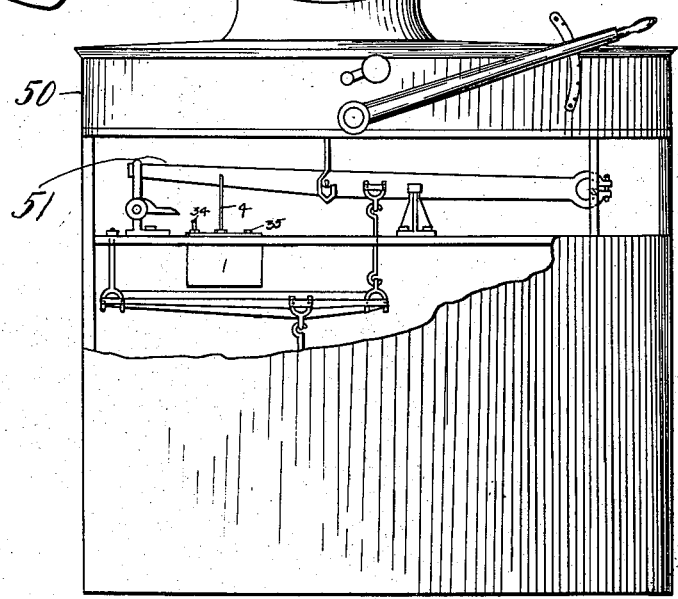
Figure 4 is an elevation of a scale mechanism illustrating the connection of my dash pot to the scale beam.

In the drawings, 1 is the body of the dash pot containing a central cylindrical cavity 2 in which the piston 3 secured to the stem 4 is arranged to move vertically, the top of this cavity being closed by an apertured cap 5 through which the stem 4 freely passes. A supplemental cylindrical cavity 6 is arranged in the body 1 adjacent the cavity 2 and is connected therewith by openings 7 and 8 situated respectively near the bottom and top of the dash pot. A valve stem 9 is mounted centrally of the cylindrical cavity 6, having a central portion 10 of larger diameter than the end portions 11 and 12 extending therefrom. Upon these end portions are slidably mounted valves 13, 14 normally resting on the upper and lower shoulders of the central portion respectively. The end 11 of the stem 9 is threaded and there is screwed upon it a cylindrical hub 15 provided with a screw driver slot 16 or other suitable means for turning. This hub consists of a disc portion 17 fitting the bore of the cavity 6 closely and an extending boss 18 adapted to engage and hold in place the coils of a compression spring 19 which extends between the hub 15 and the valve 13, which likewise consists of a disc portion 20 of a diameter closely corresponding with the bore of the cavity 6 and a boss 21 adapted to enter the coils of the spring. The end 12 of the stem 9 is similarly threaded and is screwed into a polygonal nut 22 provided with a boss for receiving and guiding the coils of a compression spring 23 extending between the nut 22 and the valve 14, which is similar in construction to the valve 13. The lower end 24 of the cavity 6 is made of a section agreeing closely with the shape of the nut 22, whereby it is held from turning although it can move freely up and down within said lower portion 24 of the cavity 6. The bore of the cavity 6 opposite the center of the stem 9 agrees closely in diameter with the diameter of the valves 13 and 14, but immediately adjacent said central portion, above and below it, are enlarged portions of the bore 25 and 26, said enlarged portions tapering respectively upward and downward to the general diameter of the cavity 6. The cavity 6 is closed by means of a cap 35 which when screwed into place will contact the valve stem 9 and prevent its vertical movement.

The body 1 of the dash pot also contains a third cylindrical cavity 27 communicating at the top and bottom of the dash pot with the cavity 2 by means of openings 28 and 29.

The cavity 27 is provided with a valve seat 30 adapted to register with and be closed or opened by a valve 31 attached to a spindle 32 tapped into and projecting through a cap 33 which closes the upper end of the cavity 27. The spindle 32 is provided with a knurled head 34 by means of which it can be turned in the cap 33, thereby raising and lowering the valve 31 and so varying the opening between said valve 31 and its seat 30.

In the application of this dash pot to a scale mechanism the body 1 may be secured in any suitable manner to the housing 50 of the scale mechanism, the piston stem 4 being pivotally attached to any beam or moving part of the scale mechanism, as, for instance, the beam 51, shown in Figure 4. The swinging motion of this beam due to the unbalanced forces previously set up by the use of the scale will be rapidly checked by the action of the dash pot.

When in operation any downward motion of the piston 3 in its enclosure must cause a transfer of fluid from that portion of the cavity below the piston 3 to that portion of the cavity above the piston through the openings 7, 8 or 28, 29. Assuming the valve 31 to be tightly closed upon its seat 30, the entire transfer of fluid must be accomplished through the opening 7, cavity 6 and opening 8 except for that portion of the fluid which can escape around the piston 3 through the clearance space between itself and the cylinder walls. The rush of fluid in an upward direction through the cavity 6 will tend to move the valves 13 and 14 in an upward direction. The valve 14 cannot move in this direction because it is in contact with the shoulder afforded by the enlarged portion 10 of the stem 9. The valve 13, however, whose upward motion is resisted only by the force of the spring 19, will move under the pressure caused by the rush of fluid and will approach the tapering part of the enlarged portion 25 of the cavity 6, causing thereby a reduction in the section of the opening existing between the valve 13 and the side of the cavity 6, thus offering increased resistance to the flow of fluid and a corresponding resistance to the motion of the piston 3, thus causing the extent of the travel of the scale beam, by which the piston 3 is moved, to be diminished and checked. The upward pressure of the fluid tending to cause the valve 13 to rise will vary in accordance with the force with which the piston 3 tends to move, so that if the tendency of the scale due to a large unbalanced force is to move the piston 3 rapidly, the force of the fluid against the valve 13 will be increased and it will be moved toward the tapered portion of the enlarged section 25 to a greater extent than if the tendency of the scale to move the piston 3 is slight. The greater the force tending to move the piston 3, the more the opening around the valve 13 will be throttled and the greater the resistance which will be offered to the flow of the fluid past the valve 13. This apparatus, therefore, will automatically increase the amount of throttling with an increased tendency for the transfer of fluid from the bottom to the top of the piston or will diminish said throttling with a diminished tendency for the flow of fluid. Should the action of the scale be to raise the piston 3, the flow of the liquid will be reversed and the valve 14 will act in exactly the manner which has been above described for the valve 13 in the case of the downward motion of the piston 3, the valve 14 approaching or receding from the tapered part of the expanded portion 26 of the cavity 6 according to the variations in the rush of fluid past it.

In order that an adjustment of the amount of fluid to be carried around the piston 3 through the cavity 6 may be made, the valve 31 may be opened or closed to such an amount as is found necessary, providing a by-pass for the motion of the fluid from one side to the other of the piston 3 and thus varying the amount of fluid which will go through the cavity 6 and pass the valves.

A convenient method of adjusting the force of the springs 19 and 23 is provided by the construction shown. To vary the force of the spring 19 the cap 35 is removed and, the stem 9 being held stationary, the hub 15 is screwed up or down upon the stem 9, while to vary the force of the spring 23 the stem 9 is turned by the screw driver in a slot at its upper end by which the nut 22, prevented from turning by the shape of the cavity in which it is contained, will be raised or lowered upon the stem, thus varying the compression of the spring 23.

While it will be apparent that the illustrated embodiment of my invention herein disclosed is well calculated to adequately fulfill the objects primarily stated, it is to be understood that the invention is susceptible to variation, modification and change without departing from the spirit and scope of the invention as set forth in the subjoined claims.

Having described my invention, I claim:

1. In a dash pot, the combination of a container having a cylindrical chamber and a passage paralleling the chamber and connected therewith adjacent the bottom and top of said chamber, fluid contained in said chamber and passage, a piston movable in said chamber, and automatic means controlled by the flow of fluid through said passage for restricting the section of said passage upon sudden movement of said piston in either direction.

2. In a dash pot, the combination of a container having a cylindrical chamber and a passage paralleling the chamber and connected therewith adjacent the bottom and top of said chamber, fluid contained in said chamber and passage, a piston vertically movable in said chamber, said passage having oppositely-turned tapered valve seats, and valves adapted to approach or recede from said tapered seats.

3. In a dash pot, the combination of a container having a cylindrical chamber and a passage paralleling the chamber and connected therewith adjacent the bottom and top of said chamber, fluid contained in said chamber and passage, a piston vertically movable in said chamber, a valve mounted in the passage and adapted to close said passage to a variable extent when fluid moves therein in one direction, and a second valve adapted to close said passage to a variable extent when fluid moves in the reverse direction.

4. In a dash pot, the combination of a container having a cylindrical chamber and a passage paralleling the chamber and connected therewith adjacent the bottom and top of said chamber, fluid contained in said chamber and passage, a piston movable in said chamber, and spring-operated automatic means controlled by the flow of fluid through said passage for restricting the section of said passage upon sudden movement of said piston in either direction.

5. In a dash pot, the combination of a container having a cylindrical chamber and a passage paralleling the chamber and connected therewith adjacent the bottom and top of said chamber, fluid contained in said chamber and passage, a piston vertically movable in said chamber, a valve stem positioned in said passage, a valve slidably mounted thereon, a spring resisting the motion of said valve, and means for adjusting the force of the spring.

6. In a dash pot, the combination of a container having a cylindrical chamber and a passage paralleling the chamber and connected therewith adjacent the bottom and top of said chamber, fluid contained in said chamber and passage, a piston vertically movable in said chamber, a valve stem located in said passage, two opposite slidably-movable valves located thereon, springs resisting the motion of said valves, and means for independently adjusting the force of said springs.

7. In a dash pot, the combination of a container having a central cylindrical chamber and supplemental passages arranged on opposite sides of said chamber and connected thereto adjacent the top and bottom of the chamber, fluid contained in said chamber and passages, a piston movable in the central chamber to force the fluid through said passages from one side of the plunger to the other, and means for controlling the flow of such fluid in either direction including an automatically operated flow-restricting valve mechanism mounted in one of said passages.

8. In a dash pot, the combination of a container having a central cylindrical chamber and supplemental passages arranged on opposite sides of said chamber and connected thereto adjacent the top and bottom of the chamber, fluid contained in said chamber and passages, a piston movable in the central chamber to force the fluid through said passages from one side of the plunger to the other, and means for controlling the flow of such fluid in either direction including an automatically operated flow-restricting valve mechanism mounted in one of said passages, and manually operated valve mechanism arranged in the other of said passages.

EDWARD G. THOMAS.

Witnesses:
 FRANCES DOYLE,
 C. E. WILCOX.